(12) United States Patent
Jedwab et al.

(10) Patent No.: US 6,487,258 B1
(45) Date of Patent: Nov. 26, 2002

(54) METHODS AND APPARATUS FOR DECODING DATA

(75) Inventors: Jonathan Jedwab, Bristol (GB); James Andrew Davis, Richmond, VA (US); Kenneth Graham Paterson, Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/212,967

(22) Filed: Dec. 16, 1998

(30) Foreign Application Priority Data

Dec. 17, 1997 (EP) .............................................. 97310252

(51) Int. Cl.$^7$ .............................................. H04L 27/06
(52) U.S. Cl. ........................ 375/340; 375/260; 375/295; 370/206; 370/208
(58) Field of Search ................................ 375/340, 260, 375/295; 370/208, 206, 210; 380/210

(56) References Cited

U.S. PATENT DOCUMENTS

| | | | | |
|---|---|---|---|---|
| 5,416,801 A | * | 5/1995 | Chouly et al. | 375/260 |
| 6,035,044 A | * | 3/2000 | Itoi | 380/210 |
| 6,130,918 A | * | 10/2000 | Humphrey et al. | 375/295 |
| 6,301,221 B1 | * | 10/2001 | Paterson | 370/208 |

OTHER PUBLICATIONS

European Search Report, EP 97 31 0252, May 28, 1998.
Designs, Codes and Cryptography, Mar. 1996, vol. 7, No. 3, pp. 187–214, Ashikhmin et al., "Fast Decoding Algorithms for First Order Reed–Muller and Related Codes".
Electronic Letters, Feb. 13, 1997, vol. 33, No. 4, pp. 267–268, Davis et al., "Peak–to–Mean Power Control and Error Correction for OFDM Transmission Using Golay Sequences and Reed–Muller Codes".
Electronic Letters, Dec. 8, 1994, vol. 30, No. 25, pp. 2098–2099, Jones et al., "Block Coding Scheme for Reduction of Peak to Mean Envelope Power Ratio of Multicarrier Transmission Schemes".
IEEE Global Telecommunications Conference, Nov. 1996, vol. 1, No. 18, pp. 740–744. Richard D. J. van Nee, "OFDM Codes for Peak–to–Average Power Reduction and Error Correction".
IEEE Tran. on Information Theory, vol. IT–32, No. 1, Jan. 1986, pp. 41–50, Conway et al., "Soft Decoding Techniques for Codes and Lattices, Including the Golay Code and the Leech Lattice".
IEEE Trans. on Communications, vol. 39, No. 7, Jul. 1991, pp. 1031–1033, Branislav M. Popovic, "Synthesis of Power Efficient Multi–tone Signals with Flat Amplitude Spectrum".
1995 IEEE, Jul. 25, 1995, pp. 825–829, Wilkinson et al., "Minimisation of the Peak to Mean Envelope Power Ratio of MultiCarrier Transmission Schemes by Block Coding".
1996 IEEE, Apr. 28, 1996, pp. 904–908, A. E. Jones et al., "Combined Coding for Error Control and Increased Robustness to System Nonlinearities in OFDM".
IRE Transactions on Information Theory, Apr. 1961, pp. 82–87, Marcel J. E. Golay, "Complementary Series*".
North–Holland Mathematical Library, vol. 16, MacWilliams et al. "The Theory of Error–Correcting Codes".

* cited by examiner

*Primary Examiner*—Stephen Chin
*Assistant Examiner*—Shuwang Liu

(57) ABSTRACT

In a coded orthogonal frequency division multiplex (COFDM) system n-bit data words are encoded as $2^m$-symbol code words, each symbol having $2^j$ possible values (e.g. j=3 for octary). An efficient decoder for these code words is provided by applying j iterations of the fast Hadamard transform, the input vector for the second and subsequent iterations being derived from the result of the immediately preceding iteration.

16 Claims, 4 Drawing Sheets

METHODS AND APPARATUS FOR DECODING DATA

TECHNICAL FIELD

This invention relates to methods and apparatus for decoding data, and to communications systems incorporating such methods and apparatus; in particular, though not exclusively, the invention relates to such methods, apparatus and systems for decoding data transmitted using multi-carrier frequency division multiplexing, such as coded orthogonal frequency division multiplexing (COFDM).

BACKGROUND ART

The increasingly widespread use of powerful computer-based equipment and appliances is resulting in rapidly increasing requirements for high-speed, high-capacity communications, based on both wireline and wireless techniques. One way of accommodating this increase is to design communications systems for operation at higher and higher symbol rates. However, an increase in symbol rate typically involves a corresponding decrease in inter-symbol spacing, and this in turn can lead to greater inter-symbol interference (ISI) and consequential errors in symbols as received. In the case of wireline links ISI can arise, for example, from signal reflections at imperfectly matched interfaces between different portions of the communications link. For wireless links a significant source of ISI is multi-path propagation involving signal reflections from objects (such as buildings) in the space traversed by the signals; mobile wireless communications can be especially susceptible to ISI from this source, because movement of a mobile unit using the link can cause continuous and complex variation in the multiple propagation paths extending to the mobile unit.

A technique which is being actively studied and developed to increase communications system capacity and counteract ISI is multi-carrier (or multitone) frequency division multiplex operation, such as COFDM operation. In a COFDM system multiple symbols are transmitted simultaneously, each symbol controlling the modulation (e.g. by phase-shift keying) of a respective one of multiple carrier signals having closely-spaced frequencies. By choosing the carrier-frequency spacing to have an appropriate relationship to the rate at which symbols are transmitted on each carrier, it is possible to ensure that each individual carrier can be demodulated without interference from the carriers adjacent to it (in which case the carriers are said to be orthogonal to one another). The set of symbols transmitted simultaneously on respective carriers during a symbol period (a code word) is chosen to encode a group of data symbols (a data word) and includes redundancy (i.e. the code word has more symbols than the data word); this redundancy is used upon reception for detection of errors in the symbols as received, and, if desired, for correction of those errors.

COFDM systems counteract ISI in part because the transmission of multiple symbols in parallel enables a desired data rate to be attained with a lower symbol rate than would be necessary if a serial system were used to transmit individual symbols in succession. A lower symbol rate implies a longer duration for each symbol and thus a longer period between symbol transitions, which reduces the impact of ISI. The error detection/correction capabilities provided by the inclusion of redundancy enhance the resistance to data corruption, by enabling some errors which occur in received symbols owing to signal fading and other causes to be detected or corrected.

However, present COFDM systems encounter difficulties in obtaining the maximum potential benefit for a particular transmitted signal power, owing to limitations arising from the typical peak-to-mean envelope power ratio (PMEPR) of the complex-valued signal from which the actual transmitted signal is derived. Because this transmitted signal is effectively the sum of several signals at closely spaced frequencies and with respective phases which change at each symbol transition, the overall signal tends to exhibit transient pronounced peaks separated by substantially longer intervals of much lower though still varying amplitude. The transmitting equipment must be adjusted to reproduce the peaks without clipping or other distortion, so for much of the time, in the intervals between peaks, that equipment is operating at a signal level well below its maximum capability. As a result the geographical range of the equipment is significantly lower than would be expected for its nominal power rating, or alternatively a much more powerful equipment must be provided to cover the desired range and then operated inefficiently.

It is known that this problem can in principle be alleviated by careful selection of the code words which encode the possible data words (for example in 'Block coding scheme for reduction of peak to mean envelope power ratio of multicarrier transmission schemes' by A. E. Jones, T. A. Wilkinson and S. K. Barton, *Electronics Letters, Dec.* 8, 1994, vol.30, no.25, pp. 2098–2099). However, in selecting code words to reduce the PMEPR it is important also to ensure the code has good error correction properties. Furthermore, implementation of a high-throughput communications system desirably involves the use of long code words and of rapid encoding and decoding procedures; the use of simple look-up tables, though readily implemented, does not lend itself to rapid operation using compact (and low-power, inexpensive) circuitry, especially during decoding, if the number of valid code words to be checked is large, as is typically the case with long code words (e.g. more than about 16 symbols). It is therefore preferable for encoding and decoding operations to be definable in terms of some analytical procedure which for example performs combinatorial logic on the data word or code word symbols to convert one to the other, or at least restricts the size of any look-up table which is used.

An additional difficulty is presented by the sheer quantity of possible code words from which a selection may be made to define a code for use in a typical system. As the number of symbols in a code word increases the number of possible code words increases much faster, even for binary symbols; for symbols having just three (ternary) or four (quaternary) possible values, the number of possible codes available becomes so huge even for quite short code words that a simple exhaustive search through all possible code words is not feasible in a realistic time even just to minimize the PMEPR. Attempting to satisfy error correction and implementational requirements as well merely adds to the difficulty of such a search, especially as it will not even be known whether there actually exists a code word set which is of the desired size and which simultaneously satisfies preferred criteria relating to PMEPR, error detection/ correction and ease of encoding and decoding. This difficulty is further exacerbated by the desirability of having a large number of code words available for use in the chosen code, in order to be able to encode a large number of different data words (i.e. data words containing relatively many symbols) and thus attain an acceptably high data transfer rate.

It is known that certain kinds of codes may have some desirable properties. Thus the paper 'Synthesis of Power Efficient Multitone Signals with Flat Amplitude Spectrum' by B. M. Popović, *IEEE Transactions on Communications*, vol.39, no.7, July 1991, pp.1031–1033 indicates that any binary or polyphase complementary sequence can be used to construct a multitone signal such that the crest factor of the real-valued signal is less than or equal to 6 dBV (which corresponds to the PMEPR of the complex-valued signal being less than or equal to 3 dB). Examples of these sequences have been described, as in the case of binary Golay complementary sequence pairs ('Complementary series' by M. J. E. Golay, *IRE Transactions on Information Theory*, vol.IT-7, April 1961, pp. 82–87). However, Popović's paper is directed to situations such as multipath fading measurements and multitone jamming, in which a single code word can be used continuously in generating the required signal. Accordingly Popović gives no guidance on how multiple such sequences could be identified just to attain the 3 dB limit on PMEPR in a practical code for conveying information; and no mention whatsoever is made of the other requirements mentioned above for a code suitable for practical implementation. Indeed Popović states that "the construction of multitone signals having minimum peak-to-peak amplitude is an old problem that still has no analytical solution".

It should be noted that Golay complementary sequence pairs and codes defined using them are different from and should not be confused with so-called Golay codes; Golay complementary sequence pairs and Golay codes were first defined, independently of one another, by the same researcher and for that reason alone both are referred to by his name.

Methods and apparatus for encoding and decoding are described in International patent application no. PCT/GB 97/02 464 (WO 98/11 698), in which a substantial number of other code words are identifiable in practice, despite the potentially huge search space of possible code words, and which provide a predictable low limit on PMEPR, have specified error detection/correction properties and are feasible for implementation in high-speed circuitry. In particular codes are described for systems in which each transmitted symbol has $2^j$ different possible values where j is a positive integer, such as binary (j=1), quaternary (j=2), octary (j=3), and higher orders. Techniques are also described for decoding these codes, involving use of the fast Hadamard transform (FHT). These techniques are effective, but they nonetheless entail substantial amounts of processing, and many applications of the fast Hadamard transform, especially in the case of octary and higher-order codes and longer code words (i.e. with more symbols).

It is an object of this invention to provide methods and apparatus for decoding such codes and which provide a reduction in the amount of processing required.

DISCLOSURE OF INVENTION

According to one aspect of this invention there is provided a method of identifying a code word within a predetermined set of code words, the code words containing symbols each having $p^j$ different possible values where p is a prime and j is an integer greater than 1, wherein a plurality of constituents, $constituent_1$ to $constituent_k$, of said code word, each constituent identifying an element of a predetermined subset of a predetermined linear code, are derived in respect of an input word; and said k constituents are combined to identify said code word according to a relationship $$(p^{b(k)}*constituent_k + p^{b(k-1)}*constituent_{k-1} + \ldots + p^{b(2)}*constituent_2 + p^{b(1)}*constituent_1) \bmod p^j$$

where each b(x) is an integer, $j > b(k) > b(k-1) > \ldots > b(2) > b(1) \geq 0$, * indicates symbol-wise multiplication, + indicates symbol-wise addition and mod indicates symbol-wise modular reduction.

According to another aspect of this invention there is provided a method of identifying a code word within a predetermined set of code words, the code words containing symbols each having $2^j$ different possible values where j is an integer greater than 1, comprising the steps of receiving an input word;

deriving the result of reducing the input word modulo $2^1$;

deriving a first constituent, $constituent_1$, by applying a Hadamard transform operation, or equivalent thereof, in respect of the result of said reduction modulo $2^1$;

setting a modifier equal to $constituent_1$;

for each successive value of a counter x from 2 to j:
  deriving the result of symbol-wise subtraction of the current value of the modifier from the input word modulo $2^x$;
  deriving another constituent, $constituent_x$, by applying a Hadamard transform operation, or equivalent thereof, in respect of the result of said subtraction modulo $2^x$;
  setting the modifier equal to the symbol-wise sum modulo $2^j$ of the modifier and the product of $2^{x-1}$ times $constituent_x$;

and identifying the code word as having the final value of said modifier.

According to a further aspect of this invention there is provided apparatus for identifying a code word within a predetermined set of code words, the code words containing symbols each having $p^j$ different possible values where p is a prime and j is an integer greater than 1, comprising:

a decoder for deriving in respect of an input word a plurality of constituents, $constituent_1$ to $constituent_k$, of said code word, each constituent identifying an element of a predetermined subset of a predetermined linear code; and a combiner for combining said k constituents to identify said code word according to a relationship $$(p^{b(k)}*constituent_k + p^{b(k-1)}*constituent_{k-1} + \ldots + p^{b(2)}*constituent_2 + p^{b(1)}*constituent_1) \bmod p^j$$

where each b(x) is an integer, $j > b(k) > b(k-1) > \ldots > b(2) > b(1) \geq 0$, * indicates symbol-wise multiplication, + indicates symbol-wise addition and mod indicates symbol-wise modular reduction.

Decoders implementing this invention enable decoding to be accomplished with relatively few applications of the fast Hadamard transform. For example, a quaternary code word can be decoded with just two successive applications of the FHT, and an octary code word with just three, irrespective of the length of the code word.

BRIEF DESCRIPTION OF DRAWINGS

Methods and apparatus for decoding data in accordance with this invention in communications systems for transmitting data using coded orthogonal frequency division multiplexing (COFDM) will now be described, by way of example, with reference to the accompanying drawings in which.

BEST MODE FOR CARRYING OUT THE INVENTION, & INDUSTRIAL APPLICABILITY

Figure 1:
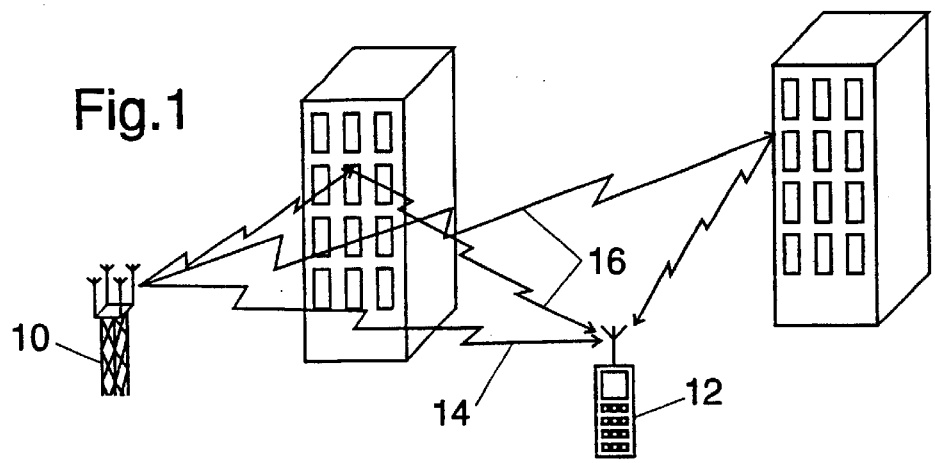
FIG. 1 illustrates multipath propagation between a base station and a mobile communications device.
Figure 2:
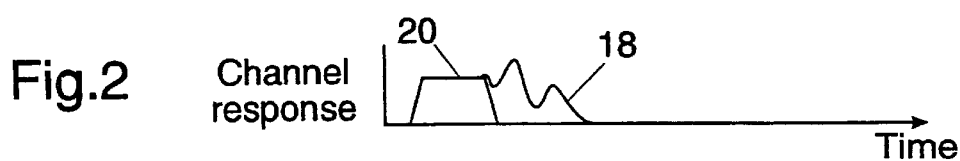
FIG. 2 is a schematic diagram showing the effect of multipath propagation on propagation of a single symbol.
Figure 3:
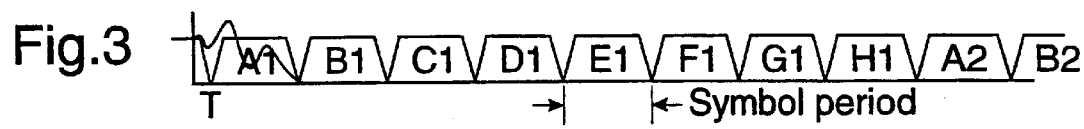
FIG. 3 is a schematic diagram showing intersymbol interference arising from multipath propagation.

FIGS. 1 to 3 illustrate in a schematic manner the problem of multipath propagation in the context of mobile communications in an urban environment. A base station 10 communicates by wireless, e.g. at microwave wavelengths, with mobile communications devices such as a mobile telephone 12. There is a direct line-of-sight signal path 14 between the base station 10 and the telephone 12, and, owing to the presence of multiple reflectors (for microwave signals) in the form of buildings and other structures, there are also multiple reflected signal paths 16. These paths are typically of differing lengths and thus involve differing propagation delays upon arrival at their destination. The overall signal as received at, for example, the mobile telephone 12 is the sum of the various signals arriving at the telephone via the different paths.

The transmitted signal may be considered as comprising a succession of symbols modulating a carrier wave (e.g. by phase-shift keying). As shown in FIG. 2, a consequence of signals traversing multiple paths with different propagation delays is that the composite signal 18 as received for a symbol is not an accurate replica of the signal 20 as transmitted for that symbol. In particular the received composite signal is typically longer in duration than the transmitted signal, and has a trailing portion with a significant amplitude after the point when an accurate replica of the transmitted signal would have terminated. If this trailing portion extends for a significant fraction of a symbol period, as shown in FIG. 3 for the pulse nominally terminating at time T, the trailing portion will overlap and interfere with reception of the following symbol. As a result that following symbol may be incorrectly received, i.e. the value detected for it in the receiver may not correctly represent the value as transmitted, even in the absence of other noise sources. Signal corruption of this kind is known as intersymbol interference (ISI).

Figure 4A:
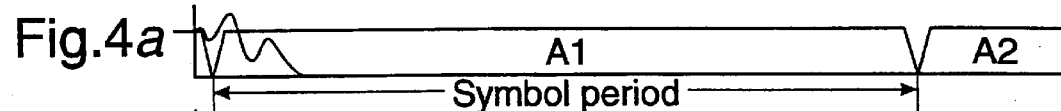
FIGS. 4a to 4h are schematic diagrams showing reduction in intersymbol interference by the use of multicarrier frequency division multiplexing.
Figure 4B:
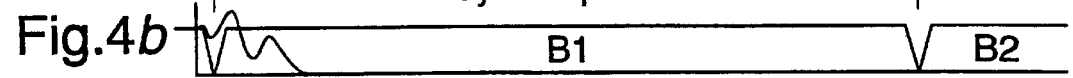
Figure 4C:
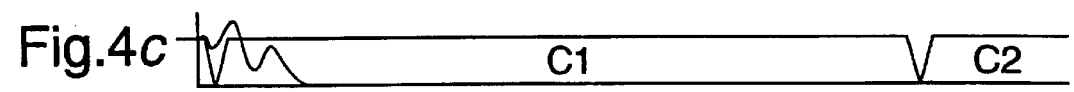
Figure 4D:
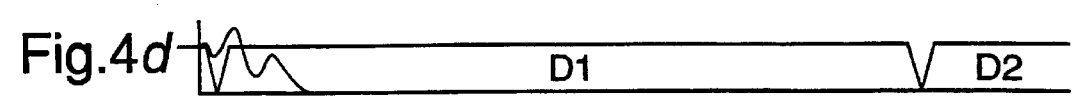
Figure 4E:
Figure 4F:
Figure 4G:
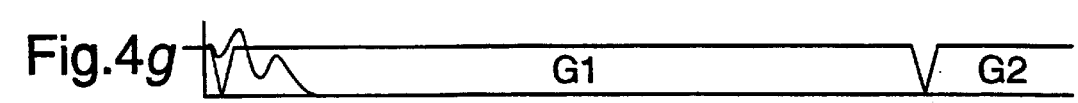
Figure 4H:
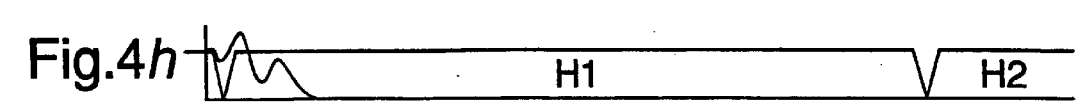

The effects of ISI can be alleviated by extending the duration of the transmitted symbols, as shown in FIG. 4a, so that each symbol as received extends beyond the trailing portion arising from multipath propagation delays. To counteract the reduction in symbol rate which would ensue, it has been proposed to transmit multiple symbols simultaneously, each modulating a respective one of multiple carrier waves.

Thus if eight carriers are used, as shown in FIGS. 4a to 4h, the symbol period on each carrier can be eight times that which would be necessary with a single carrier (as shown in FIG. 3) while maintaining the same overall symbol rate. If the frequency spacing between the multiple carriers is an integer multiple of the inverse of the symbol period, it is possible to recover the individual symbol stream modulating each of the carriers without interference from the other carriers. This technique is known as orthogonal frequency division multiplexing (OFDM).

Figure 5:
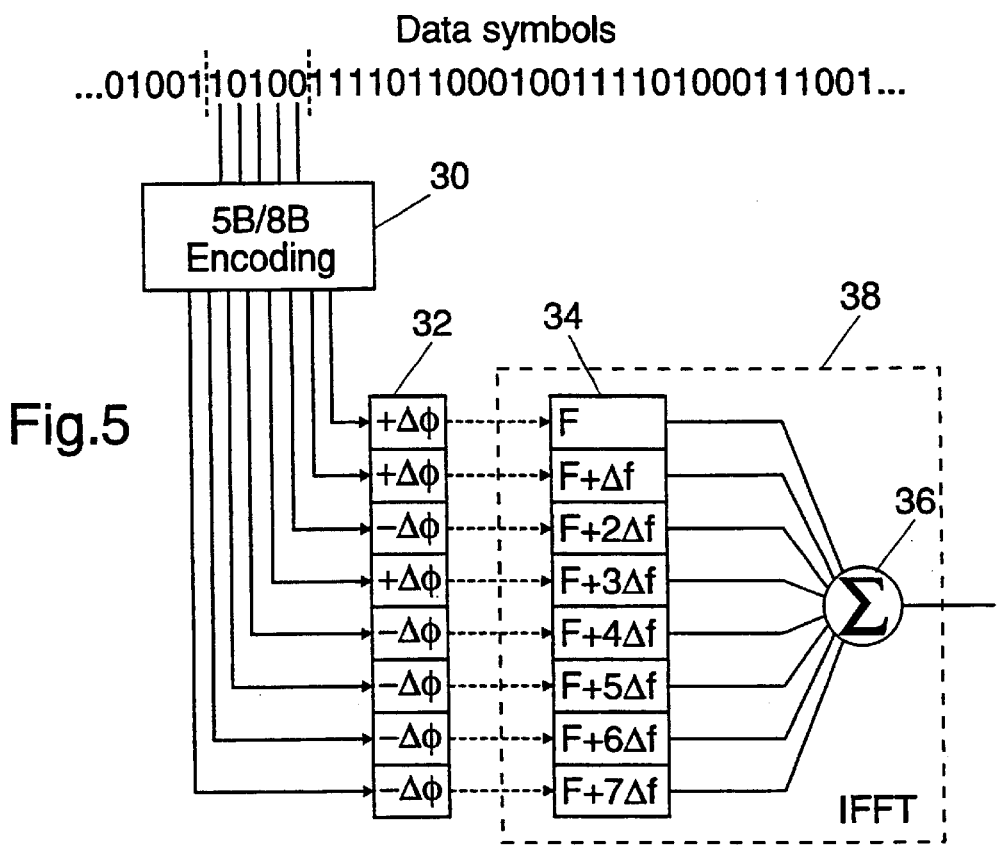
FIG. 5 shows an encoder and modulator for use in a COFDM system.

In addition to the use of multiple carriers, it has also been proposed to provide additional error detection/correction capabilities by the use of block encoding. Thus, as shown in FIG. 5, a serial stream of data symbols (binary symbols in this example) is notionally divided into successive groups or words each containing five symbols. A group of five symbols is input to a five-bit to eight-bit (5 B/8 B) encoder 30 which outputs a corresponding eight-bit code word. This code word is applied to a bank of eight phase shift controllers 32 which control a bank of eight oscillators 34 producing carrier signals at eight successive frequencies at intervals $\Delta f$ apart. Each individual bit in the code word causes a respective phase shift controller to impose either a positive or negative phase shift $\Delta\psi$ to modulate the carrier signal produced by the respective oscillator, depending on the current value of that bit.

Figure 6:
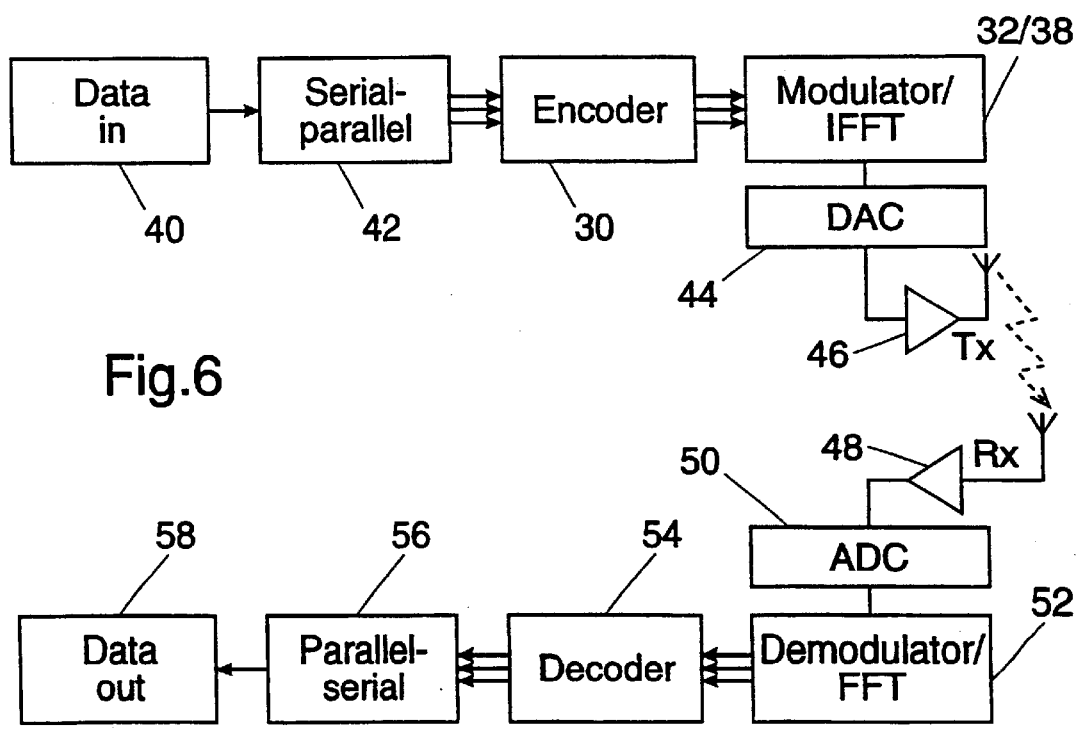
FIG. 6 is a block schematic diagram of a COFDM system incorporating the encoder and modulator of FIG. 5.

The modulated outputs of the oscillators 34 are combined in an adder 36 to produce the transmitted signal. In practice the functions of the oscillators 34 and the adder 36 are conveniently combined in a digital signal processor implementing an inverse fast Fourier transform (IFFT), as indicated by the dashed box 38. Thus, as shown schematically in FIG. 6, data to be transmitted are received in block 40 and converted to parallel form in a serial-to-parallel converter 42. The parallel data are encoded in encoder 30, as described above, and the encoded data control generation of the multi-carrier signal in the modulator/IFFT 32/38. This multicarrier signal is converted to analogue form in a D-A converter 44, amplified and transmitted by a transmitter 46.

Reception is essentially a reverse of this process: the signal is received and amplified by a receiver 48, and then converted to digital form by an A-D converter 50. The digital signal is supplied to a demodulator 52 which comprises a digital signal processor implementing the fast Fourier transform (FFT) to separate and demodulate the component signals in the composite multi-carrier signal. The demodulated data are passed to a decoder 54 which reverses the encoding applied by the encoder 30, and typically also performs error detection or correction functions. Thereafter a parallel-to-serial converter 56 changes the data into serial form to be output at block 58.

Figure 7:
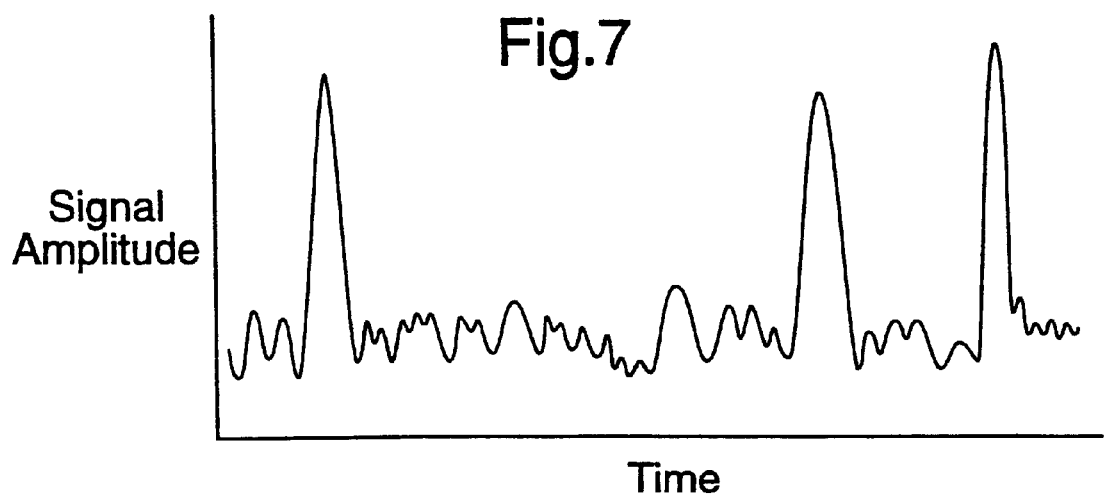
FIG. 7 illustrates the general form of a COFDM signal waveform without any limitation of PMEPR.

The choice of code which is implemented by the encoder 30 has significant implications for the efficient operation of the transmitter 46. A multi-carrier signal comprises the sum of several equal-amplitude sinusoidal waves having equally spaced frequencies. As a result, the maximum absolute value of the composite signal is strongly sensitive to the relative phases of the component sinusoids. These relative phases are changed at the end of each symbol period by the phase shift controllers 32, according to the value of the code word to be transmitted during the next symbol period. Depending on the particular set of relative phases, and therefore on the value of the current code word, the amplitude of the transmitted signal will have occasional pronounced peaks together with intervals of much lower though still varying value, as illustrated in FIG. 7. Thus the peak-to-mean envelope power ratio of the signal is relatively high.

For such a signal to be transmitted without distortion, it is necessary for the transmitter 46 to use a linear amplifier and to operate it in a relatively inefficient manner, so that most of its dynamic range is unused except for the infrequent occasions when the amplitude of the transmitted signal reaches its peak value.

It has been proposed to reduce this problem by appropriate choice of the set of code words which are actually used to encode data for transmission. The use of block coding to avoid the use of code words which produce extreme values of PMEPR has been suggested in 'Minimisation of the peak to mean envelope power ratio of multicarrier transmission schemes by block coding' by T. A. Wilkinson and A. E. Jones, 1995 *IEEE 45th Vehicular Technology Conference*, July 1995, pp. 825–829; although this proposal indicates that reductions in PMEPR are possible, it also identifies the difficulty of selecting a set of code words which both enables efficient implementation of coding and decoding and provides desired capabilities for detecting/correcting errors in the demodulated signal. Possible ways of addressing this problem are discussed, but no actual solution is presented. A modification to this approach is disclosed in 'Combined coding for error control and increased robustness to system nonlinearities in OFDM' by the same authors in 1996 *IEEE 46th Vehicular Technology Conference*, April 1996, pp. 904–908. In this modification a linear block code is chosen to provide desired properties of error detection/correction; it is proposed then to exploit the linearity and redundancy in the code to transform the code values systematically to new values which reduce the PMEPR but have equivalent error detection/correction properties. Examples are given for 4 B/7 B, 4 B/8 B and 11 B/15 B codes, in which the required transformation is identified by a procedure involving listing all possible code word values in order of the PMEPR for a multi-carrier signal modulated in accordance with each code word. Although such an exhaustive-search approach is feasible for relatively short code words (e.g. of the order of 15 bits), the number of possible code words to be checked increases very rapidly with code word length. Thus, even for a 32-bit code word, in excess of 4,000,000,000 code words would potentially need to be listed, and this would be at best extremely time-consuming and in practice possibly prohibitive. The obstacle presented by this requirement is potentially increased by the absence of any guarantee that an appropriate subset of code words actually exists within the set being examined.

Popović, in the paper cited earlier, proposes the use of a single binary or polyphase complementary sequence. However, the 1996 paper mentioned above suggests that such sequences are not readily amenable in relation to their error correction/detection capability.

The patent application referenced above describes ways of identifying a set containing many different code words all of which satisfy desired criteria regarding error detection/correction properties, the maximum PMEPR of multi-carrier signals modulated in accordance with those code words, and ease and efficiency of implementation of a practical encoder and decoder (for example including use of combinatorial logic).

As described in that patent application, a set of code words is constructed by combining a 'base' code, derived from a 'generator matrix', with one or more 'coset representatives'. For example, in the case of 16-bit (binary) code words the generator matrix is:

(0000 0000 1111 1111) ($X_1$)
(0000 1111 0000 1111) ($X_2$)
(0011 0011 0011 0011) ($X_3$)
(0101 0101 0101 0101) ($X_4$)
(1111 1111 1111 1111) ($X'$)

The 16-bit base code comprises all thirty-two linear combinations of rows of this generator matrix, that is combinations of the form $$(a_1 X_1 + a_2 X_2 + a_3 X_3 + a_4 X_4 + a'X') \bmod 2$$

where addition and modular reduction are performed bitwise and row coefficients $a_1$, $a_2$, $a_3$, $a_4$ and a' each take values of 0 or 1. This base code is linear, i.e. the result of a bitwise exclusive-OR operation (modulo-2 addition) on any two of its code words is another code word in the code.

A corresponding generator array is created by combining the 16-bit generator matrix with additional rows (in this case six) derived by bitwise multiplication of all possible pairs of the rows $X_1$, $X_2$, $X_3$ and $X_4$:

(0000 0000 0000 1111) ($X_1 * X_2$)
(0000 0000 0011 0011) ($X_1 * X_3$)
(0000 0000 0101 0101) ($X_1 * X_4$)
(0000 0011 0000 0011) ($X_2 * X_3$)
(0000 0101 0000 0101) ($X_2 * X_4$)
(0001 0001 0001 0001) ($X_3 * X_4$)

Twelve particular coset representatives (for example, 0001 0010 0001 1101) constructed in a specific way from these additional rows are each combined by bitwise exclusive-OR operations with all code words in the 16-bit base code to produce the final desired set of code words, constituting a set of cosets of the base code.

Those code words constitute a set of cosets of a linear sub-code (in this case the whole code) of a base code having a generator matrix comprising the rows $X_1$, $X_2$, $X_3$, $X_4$ and X'. Using a base code of this kind provides desired error detection/correction properties. Selection of a linear sub-code ensures that encoding and decoding within each coset can be implemented compactly, for example using combinatorial logic. A coset can in general be considered to be a systematic shift or translation of the base code to a different part of the overall space of possible code words. Use of cosets of the linear sub-code enables avoidance of certain undesired code words (such as all zeroes and all ones) which would result in particularly high values of PMEPR, but can also enable the error control properties of the base code to be retained to some extent. Choosing the code words from a set of such cosets allows good control of PMEPR because each coset of the base code tends to contain code words having broadly similar associated PMEPRs. In particular cases where the coset representatives have a form described in the patent application referenced above, it can be shown that the PMEPR does not exceed 3 dB; the minimum Hamming distance (i.e. the minimum number of symbols whose value must be altered, for example by interference, to transform a valid code word containing $2^m$ binary symbols into some other valid code word) is $2^{m-2}$.

In more general terms the generator matrix for a particular code word length $2^m$ is:

$$((2.0+1)\times 2^m)/2^m ((2.1+1)\times 2^m)/2^m \ldots ((2.z+1)\times 2^m)/2^m \ldots ((2.(2^m-1)+1)\times 2^m)/2^m$$

$$((2.0+1)\times 2^{m-1})/2^{m-1} ((2.1+1)\times 2^{m-1})/2^{m-1} \ldots ((2.z+1)\times 2^{m-1})/2^{m-1} \ldots ((2.(2^m-1)+1)\times 2^{m-1})/2^{m-1}$$

$$((2.0+1)\times 2^y)/2^y ((2.1+1)\times 2^y)/2^y \ldots ((2.z+1)\times 2^y)/2^y \ldots ((2.(2^m-1)+1)\times 2^y)/2^y$$

$((2.0+1)\times 2^1)/2^1 ((2.1+1)\times 2^1)/2^1 \ldots ((2.z+1)\times 2^1)/2^1 \ldots ((2.(2^m-1)+1)\times 2^1)/2^1$ $((2.0+1)\times 2^0)/2^0 ((2.1+1)\times 2^0)/2^0 \ldots ((2.z+1)\times 2^0)/2^0 \ldots ((2.(2^m-1)+1)\times 2^0)/2^0$ where z has integer values from 0 to $2^m-1$, y has integer values from m to 0, and x indicates bitwise multiplication (bitwise logical AND) of two factors (such as (2.z+1) and $2^y$) both expressed as (m+1)-bit binary numbers, and the result of division is expressed as a single digit. The first line of this matrix (y=m) gives the row $X_1$, the second line y=m−1) gives the row $X_2$, the penultimate line (y=1) gives the row $X_m$ and the final line (y=0) gives the row X'.

The $2^m$-bit base code comprises all linear combinations of rows of the generator matrix, that is combinations of the form $(a_1X_1+a_2X_2+a_3X_3+ \ldots +a_mX_m+a'X') \bmod 2$ where row coefficients $a_1, a_2, a_3, \ldots a_m$ and a' each take values of 0 or 1. The corresponding generator array is created by combining the $2^m$-bit generator matrix with additional rows derived by bitwise multiplication of all possible pairs of the rows $X_1, X_2, X_3 \ldots X_m$. Particular coset representatives derived from these additional rows in a specific way are each combined by bitwise exclusive-OR operations with all code words in the $2^m$-bit base code to produce the required code words, constituting a set of cosets of the base code.

This technique is also applicable to coding with any higher number $2^j$ of symbol values, such as quaternary (j=2; $2^j$=4), octary (j=3; $2^j$=8) and higher orders. In such cases the same generator matrix is used as described above, e.g. for a code word containing 8 symbols ($2^m$=8 with m=3):

(0000 1111) ($X_1$)
(0011 0011) ($X_2$)
(0101 0101) ($X_3$)
(1111 1111) (X')

An 8-symbol quaternary base code (four possible symbol values) comprises all 256 linear combinations of the rows of this generator matrix, that is combinations of the form $(a_1X_1+a_2X_2+a_3X_3+a'X') \bmod 4$ where addition is now performed symbol-wise modulo $2^j$ (i.e. modulo 4 for quaternary), modular reduction is performed symbol-wise and row coefficients $a_1, a_2, a_3$ and a' each take all integer values from 0 to $2^j-1$ (i.e. 0 to 3 for quaternary). This base code is linear, i.e. the result of symbol-wise addition modulo 4 on any two of its code words is another code word in the code. The corresponding generator array is created by combining the generator matrix with additional rows. These additional rows are derived by symbol-wise multiplication of all possible pairs of the rows $X_1, X_2$ and $X_3$, that is $X_1*X_2, X_1*X_3$ and $X_2*X_3$, and then further multiplication by $2^{j-1}$, e.g. by 2 for quaternary coding or by 4 for octary coding. Thus for 8-symbol quaternary coding the additional rows are:

(0000 0022) $2(X_1*X_2)$
(0000 0202) $2(X_1*X_3)$
(0002 0002) $2(X_2*X_3)$

Likewise a $2^m$-symbol quaternary base code comprises all linear combinations of rows of the generator matrix, that is combinations of the form $(a_1X_1+a_2X_2+a_3X_3+ \ldots +a_mX_m+a'X') \bmod 4$ where row coefficients $a_1, a_2, a_3, \ldots a_m$ and a' each take values of 0, 1, 2 or 3. The corresponding generator array is created by combining the $2^m$-symbol generator matrix with additional rows derived by symbol-wise multiplication of all possible pairs of the rows $X_1, X_2, X_3, \ldots X_m$. Particular coset representatives derived from these additional rows in a specific way are each combined by symbol-wise addition modulo 4 with all code words in the $2^m$-symbol base code to produce the required code words.

Similar codes for other code word lengths and/or for coding with different numbers of symbols (e.g. octary) can be defined in like manner. Thus, where the number of symbol values is $2^j$, the base code comprises all linear combinations of rows of the generator matrix, that is combinations of the form $(a_1X_1+a_2X_2+a_3X_3+ \ldots +a_mX_m+a'X') \bmod 2^j$ where addition is performed symbol-wise modulo $2^j$, modular reduction is performed symbol-wise and row coefficients $a_1, a_2, a_3, \ldots a_m$ and a' each take values of 0, 1, …, $2^j-1$. This base code is linear, i.e. the result of a symbol-wise addition modulo $2^j$ on any two of its code words is another code word in the code. The corresponding generator array is created by combining the $2^m$-symbol generator matrix with additional rows, which are derived by symbol-wise multiplication of all possible pairs of the rows $X_1, X_2, X_3, \ldots X_m$ and then further multiplication by $2^{j-1}$. Particular coset representatives derived from these additional rows in a specific way are each combined by symbol-wise addition modulo $2^j$ with all code words in the $2^m$-symbol base code to produce the required code words.

For a 16-symbol octary code (i.e. m=4 and j=3), as discussed in examples given below, the generator array is:

(0000 0000 1111 1111) ($X_1$)
(0000 1111 0000 1111) ($X_2$)
(0011 0011 0011 0011) ($X_3$)
(0101 0101 0101 0101) ($X_4$)
(1111 1111 1111 1111) (X')
(0000 0000 0000 4444) $4(X_1*X_2)$
(0000 0000 0044 0044) $4(X_1*X_3)$
(0000 0000 0404 0404) $4(X_1*X_4)$
(0000 0044 0000 0044) $4(X_2*X_3)$
(0000 0404 0000 0404) $4(X_2*X_4)$
(0004 0004 0004 0004) $4(X_3*X_4)$ and the twelve coset representatives constructed from these additional rows are:

TABLE 1

| | |
|---|---|
| (0004 0040 0004 4404) | $4(X_1*X_2)\oplus 4(X_2*X_3)\oplus 4(X_3*X_4)$ |
| (0004 0400 0004 4044) | $4(X_1*X_2)\oplus 4(X_2*X_4)\oplus 4(X_3*X_4)$ |
| (0000 0440 0044 0404) | $4(X_1*X_3)\oplus 4(X_2*X_3)\oplus 4(X_2*X_4)$ |
| (0004 0400 0040 0444) | $4(X_1*X_3)\oplus 4(X_3*X_4)\oplus 4(X_2*X_4)$ |
| (0000 0440 0404 0044) | $4(X_1*X_4)\oplus 4(X_2*X_4)\oplus 4(X_2*X_3)$ |
| (0004 0040 0400 0444) | $4(X_1*X_4)\oplus 4(X_3*X_4)\oplus 4(X_2*X_3)$ |
| (0004 0004 0040 4404) | $4(X_1*X_2)\oplus 4(X_1*X_3)\oplus 4(X_3*X_4)$ |
| (0004 0004 0400 4044) | $4(X_1*X_2)\oplus 4(X_1*X_4)\oplus 4(X_3*X_4)$ |
| (0000 0044 0440 0404) | $4(X_2*X_3)\oplus 4(X_1*X_3)\oplus 4(X_1*X_4)$ |
| (0000 0404 0440 0044) | $4(X_2*X_4)\oplus 4(X_1*X_4)\oplus 4(X_1*X_3)$ |
| (0000 0404 4404 4004) | $4(X_1*X_3)\oplus 4(X_1*X_2)\oplus 4(X_2*X_4)$ |
| (0000 0044 0404 4004) | $4(X_2*X_3)\oplus 4(X_1*X_2)\oplus 4(X_1*X_4)$ |

Selected ones of these coset representatives (in the examples below, the first eight) are combined by symbol-wise addition modulo 8 with all code words in the 16-symbol base code to produce the final set of octary code words.

In discussing the error detecting/correcting properties of quaternary, octary and higher-order codes, the minimum Hamming distance alone does not fully describe the extent of possible errors affecting a code word. This is because an error in a single symbol can involve a transition through up to $2^{j-1}$ adjacent symbol values (where the values $2^j-1$ and 0 are considered to be adjacent). The practical effect may be as serious as, or more serious than, two or more errors in different symbols each involving only a single transition to an adjacent symbol value. For example, a change of a single octary symbol from value 6 to value 1 (a transition through 3 adjacent values) may be more serious than a change of two octary symbols, one from 6 to 7 and another from 7 to 0 (both being transitions to an adjacent value). Therefore an additional useful measure is the minimum Lee distance, defined as the minimum number of symbol value transitions required to transform a valid code word into some other valid code word. In the binary case the Hamming and Lee distances are identical.

The methods and apparatus for encoding and decoding COFDM signals as described in the above-referenced patent application provide a highly advantageous combination of error detection/correction properties, low PMEPR, convenience of implementation and useful rate of data transfer. Both encoding and decoding can be accomplished using circuitry which incorporates combinatorial logic, and the above-referenced patent application describes several such decoders based on Lee distance.

These decoders are based on the "Supercode" decoding method described in 'Soft decoding techniques for codes and lattices, including the Golay code and the Leech lattice' by J. H. Conway and N. J. A. Sloane, *IEEE Trans. Inform. Theory*, 1986, vol.IT-32, no. 1, pp. 41–50, but with a significant modification to enable its use with quaternary (and higher-order) codes. For each coset representative in turn that coset representative is subtracted symbol-wise (modulo $2^j$) from the received code word, and the result is decoded as an element of the relevant base code, at the same time assigning a "score" to that coset representative. The decision as to which code word to decode to is made by selecting a coset whose representative attains the highest score (arbitrarily if more than one attains that score), and within that coset selecting the element of the base code previously identified for that coset.

The decoding of an element of the base code uses the fast Hadamard transform (FHT), as described in 'The Theory of Error-Correcting Codes' by F. J. MacWilliams and N. J. A. Sloane, North-Holland, Amsterdam, 1986. Specifically, the fast Hadamard transform is applied to multiple input vectors whose symbols are not constrained to have the value +1 or −1 (as is conventionally the case), in order collectively to decode the result of the above subtraction as if it were a received code word of the base code. For each input vector a transform coefficient of maximum magnitude is selected. According to the sign of that transform coefficient, one or other of an associated pair of elements of the first-order binary Reed-Muller code RM(1,m) could then be output. Although this is analogous to the procedure for decoding a received code word of RM(1,m), the output for each input vector would not represent a decoding of that vector as an element of RM(1,m).

Although these decoders are effective, for higher-order codes (e.g. octary) and longer code words, the amount of processing involved, including the number of required applications of the FHT, could become prohibitive in practical situations.

Figure 8:
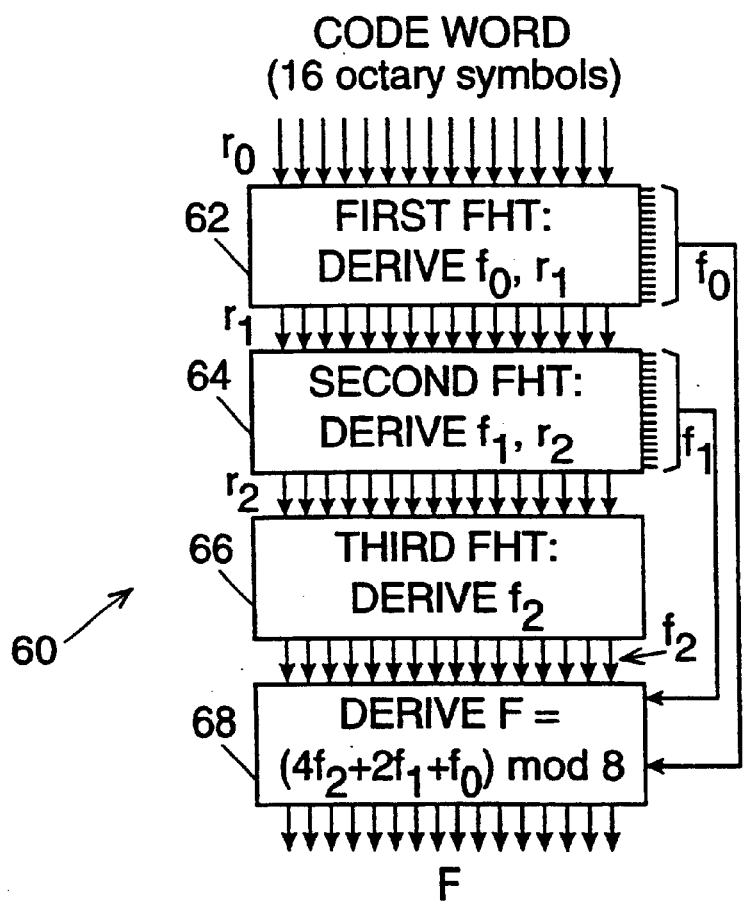
FIG. 8 shows a decoder incorporating the present invention for decoding 16-symbol octary code words.

FIG. 8 shows an alternative decoder 60, in this example for use with 16-symbol octary base code words, which significantly reduces the required number of applications of the FHT. The individual blocks of this decoder 60 may in turn be incorporated in a decoder 70, shown in FIG. 9, which provides an advantageous variation of the modified Supercode method described above to decode a code word which has been combined with a coset representative prior to transmission. In particular, the decoder 70 interleaves the subtraction of coset representatives with the operation of the constituent blocks of the decoder 60, to give a much faster decoder than would be obtained by using the full procedure implemented in the decoder 60 in respect of each coset representative in turn. A score is assigned to each coset representative and used to select a coset representative whose score either attains the highest value, or exceeds a predetermined threshold (in wich case processing of further coset representatives is omitted). The decoders 60 and 70 also apply the FHT to input vectors whose symbols are not constrained to have the value +1 or −1; however, the FHT is used for a different purpose from that described in the above-referenced patent application.

Referring to FIG. 8, a 16-symbol octary received code word $r_0$ to be decoded by the decoder 60 is provided to a first FHT circuit 62, which applies the FHT in respect of that word and derives, as described below, a 16-component vector $f_0$ (which is a constituent of the output code word) and a modified word $r_1$.

The modified word $r_1$ is supplied to a second FHT circuit 64, which applies the FHT in respect of the word $r_1$ and derives a 16-component vector $f_1$ (another constituent of the output code word) and another modified word $r_2$. This modified word $r_2$ is supplied to a third FHT circuit 66, which applies the FHT in respect of that word and derives a third 16-component vector $f_2$ (a third constituent of the output code word).

Each FHT circuit 62, 64 and 66 includes a so-called 'Green machine' for performing the FHT (see the book by MacWilliams and Sloane referenced above, pp. 423–5), or a modification of the FHT which identifies a transform component of largest absolute value without deriving all transform components (see, for example, 'Fast decoding algorithms for first order Reed-Muller and related codes' by A. E. Ashikhmin and S. N. Litsyn, *Designs, Codes and Cryptography*, vol.7, 1996, pp.187–214). Alternatively the FHT circuits 62, 64 and 66 may identify a transform component of largest absolute value by calculating a Hadamard transform (or a modification analogous to that mentioned above) without using the actual FHT algorithm itself.

The three vectors $f_0$, $f_1$ and $f_2$ are supplied by the FHT circuits 62, 64 and 66 to a combiner circuit 68 which combines the constituent vectors to derive a decoded 16-symbol output word F according to the relationship $$F = (4f_2 + 2f_1 + f_0) \bmod 8$$

The operation of the circuits 62 to 68 in the decoder 60 will be described in more detail by reference to a specific example of a 16-symbol octary base code word $$(a_1X_1 + a_2X_2 + a_3X_3 + a_4X_4 + a'X') \bmod 8$$

with row coefficients $a_1=5$, $a_2=7$, $a_3=3$, $a_4=6$ and $a'=6$, i.e. with a value of 6417 5306 3164 2053. This code word is assumed to have been corrupted in transit and has been received as 2411 6316 3152 2453, which constitutes the value for the octary word $r_0$.

In the first FHT circuit 62 a 16-component vector $D_0$ is derived by applying the expression $$|1 - (r_0)_z \bmod 2| - \frac{1}{2} \quad (1)$$

for values of z from 0 to 15 to define each respective component of the vector $D_0$. In this expression (1) the term $(r_0)_z$ indicates component z of the word $r_0$. It will be noted that expression (1) yields values of $+\frac{1}{2}$ or $-\frac{1}{2}$; for convenience of implementation, each component may in practice be multiplied by two without affecting the derived values $f_0$ and $r_1$. For the example (errored) received code word given above, these components of $D_0$ (after multiplication by two) are (1, 1,-1,-1, 1,-1,-1, 1,-1,-1,-1, 1, 1, 1,-1,-1)

The first FHT circuit 62 then applies the FHT to the vector $D_0$ to derive sixteen transform components labelled from 0 to 15, as follows:

(-2,-2, 6, 6,-2,-2,-2,-2, 2, 2, 2, 2, 2, 2, 10,-6)

0A component of largest absolute value (in this case, 10) is identified, the label (14) for this component is expressed as a four-bit binary value $c_1c_2c_3c_4$ (1110), and a coefficient c' is set to a value of 0 or 1 according to whether the component is positive or negative respectively (in this case, 0). Then the vector $f_0$ is derived according to the relationship $$f_0 = (c_1X_1 + c_2X_2 + c_3X_3 + c_4X_4 + c'X') \bmod 8$$

which for the example received code word is $(X_1+X_2+X_3)$ mod 8=0011 1122 1122 2233. Here and in all subsequent instances of addition and/or modular reduction of vectors, these operations are performed symbol-wise.

The modified word $r_1$ supplied to the second FHT circuit 64 is derived according to the relationship $$r_1 = (r_0 - f_0) \bmod 8$$

where the subtraction of vectors is performed symbol-wise (here and subsequently). Thus in this case $r_1$ has a value of 2400 5274 2030 0220.

In the second FHT circuit 64 a 16-component vector $D_1$ is derived by applying the expression $$|2-(r_1)_z \bmod 4|-1 \qquad (2)$$

for values of z from 0 to 15 to define each respective component of the vector $D_1$. In this expression (2) the term $(r_1)_z$ indicates component z of the word $r_1$. For the current example, these components of $D_1$ are (-1, 1, 1, 1, 0,-1, 0, 1,-1, 1, 0, 1, 1,-1,-1, 1)

The second FHT circuit 64 then applies the FHT to the vector $D_1$ to derive sixteen transform components labelled from 0 to 15, as follows:

(3,-5,-5, 3, 3,-5,-1,-9, 1, 1,-3,-3, 1, 1, 1, 1)

A component of largest absolute value (-9) is identified, the label (7) for this component is expressed as a four-bit binary value $c_1c_2c_3c_4$ (0111), and a coefficient c' is set to a value of 0 or 1 according to whether the component is positive or negative respectively (in this case, 1). Then the vector $f_1$ is derived according to the relationship $$f_1 = (c_1X_1 + c_2X_2 + c_3X_3 + c_4X_4 + c'X') \bmod 4$$

i.e. $(X_2+X_3+X_4+X') \bmod 4 = 1223\ 2330\ 1223\ 2330$. The modified word $r_2$ supplied to the third FHT circuit 66 is derived according to the relationship $$r_2 = (r_1 - 2f_1) \bmod 8$$

Thus in the present example $r_2 = 0042\ 1414\ 0472\ 4440$.

In the third FHT circuit 66 a 16-component vector $D_2$ is derived by applying the expression $$|4-(r_2)_z \bmod 8|-2 \qquad (3)$$

for values of z from 0 to 15 to define each respective component of the vector $D_2$. In this expression (3) the term $(r_2)_z$ indicates component z of the word $r_2$. For the present example these components of $D_2$ are (2, 2,-2, 0, 1,-2, 1,-2, 2,-2, 1, 0,-2,-2,-2, 2)

The third FHT circuit 66 then applies the FHT to the vector $D_2$ to derive sixteen transform components labelled from 0 to 15, as follows:

(-3, 5, 1, 9, 9, 1, 9, 1, 3, 3, 11,-5,-1,-17, 3, 3)

A component of largest absolute value (-17) is identified, the label (13) for this component is expressed as a four-bit binary value $c_1c_2c_3c_4$ (1101), and a coefficient c' is set to a value of 0 or 1 according to whether the component is positive or negative respectively (in this case, 1). Then the vector $f_2$ is derived according to the relationship $$f_2 = (c_1X_1 + c_2X_2 + c_3X_3 + c_4X_4 + c'X') \bmod 2$$

i.e. $(X_1+X_2+X_4+X') \bmod 2 = 1010\ 0101\ 0101\ 1010$.

The three vectors $f_0$, $f_1$ and $f_2$ are supplied to the combiner circuit 68 for further processing as described above to derive an output code word F. For the present example F=(4(1010 0101 0101 1010)+2(1223 2330 1223 2330)+(0011 1122 1122 2233))mod 8=6417 5306 3164 2053, i.e. the base code word as transmitted.

If it is desired to recover the row coefficients $a_1$, $a_2$, $a_3$, $a_4$ and a' then F is evaluated in terms of the generator matrix rows $X_1$, $X_2$, $X_3$, $X_4$ and X' rather than as a 16-component vector. Thus, in the above example, F would be evaluated as $(4(X_1+X_2+X_4+X')+2(X_2+X_3+X_4+X')+(X_1+X_2+X_3))$ mod 8=$(5X_1+7X_2+3X_3+6X_4+6X')$ mod 8. In this case the procedure still identifies code word F even though F need not be explicitly determined as part of the procedure.

The procedure described with reference to FIG. 8 can be considered as identifying elements, $f_0$, $f_1$ and $f_2$, each belonging to a respective predetermined subset of a predetermined linear code. In this procedure every element of such a subset is a candidate result for $f_0$, $f_1$ or $f_2$ as appropriate. In the case of $f_0$, for example, the predetermined linear code is the 16-symbol octary base code defined above, and the predetermined subset is the set of all vectors of the form $$(c_1X_1 + c_2X_2 + c_3X_3 + c_4X_4 + c'X') \bmod 8$$

in which each of the coefficients $c_1$, $c_2$, $c_3$, $c_4$ and c' can take only the values 0 or 1 (rather than the values 0 to 7 inclusive). For $f_1$, the predetermined linear code is the 16-symbol quaternary base code defined above, and the predetermined subset is the set of all vectors of the form $$(c_1X_1 + c_2X_2 + c_3X_3 + c_4X_4 + c'X') \bmod 4$$

in which each of the coefficients $c_1$, $c_2$, $c_3$, $c_4$ and c' can take only the values 0 or 1 (rather than the values 0 to 3 inclusive).

The decoding method embodied in the decoder of FIG. 8 can readily be extended for use with other lengths of code word and/or higher-order codes. In the general case of code words of length $2^m$ symbols, each symbol having $2^j$ possible values, a total of j FHT circuits are required, which for the purposes of the following description are identified by an index k having values from 0 (corresponding to the first FHT circuit 62 in FIG. 8) to j−1 (corresponding to the third FHT circuit 66 in the octary case).

In the FHT circuit with index k a vector $D_k$ is derived from the word $r_k$ received by that circuit, by applying the expression $$|2^k - (r_k)_z \bmod 2^{k+1}| - 2^{k-1} \quad (4)$$

for values of z from 0 to $2^m-1$ to define each respective component of the vector $D_k$. In this expression (4) the term $(r_k)_z$ indicates component z of the word $r_k$.

Each FHT circuit then applies the FHT to the vector $D_k$ to derive $2^m$ transform components, labelled from 0 to $2^m-1$. A component of largest absolute value is identified, the label for this component is expressed as an m-bit binary value $c_1 c_2 \ldots c_m$, and a coefficient c' is set to a value of 0 or 1 according to whether the component is positive or negative respectively. Then the vector $f_k$ is derived according to the relationship $$f_k = (c_1 X_1 + c_2 X_2 + \ldots + c_m X_m + c' X') \bmod 2^{j-k}$$

For all but the final FHT circuit (k=j−1) the modified word $r_{k+1}$ supplied to the next FHT circuit is derived according to the relationship $$r_{k+1} = (r_k - 2^k f_k) \bmod 2^j$$

The j vectors $f_0, f_1, \ldots, f_{j-1}$ are combined in a combiner circuit (corresponding to the circuit 68 for the octary case) according to the relationship $$F = (2^{j-1} f_{j-1} + 2^{j-2} f_{j-2} + \ldots + f_0) \bmod 2^j$$

to produce the required output base code word F.

It should be noted that in view of the repetitive pattern of the derivation in each FHT circuit, distinguished solely by the value of the index k from circuit to circuit, the decoding method may also readily be implemented in an iterative manner, for example by a processor executing appropriate software program instructions.

Furthermore, the relationship for the output base code word F can alternatively be expressed as $$F = (2( \ldots 2(2(2(2f_{j-1} + f_{j-2}) + f_{j-3}) + f_{j-4}) \ldots + f_1) + f_0) \bmod 2^j$$

Thus F can clearly be evaluated in a recursive manner. For example, in the octary case discussed above $$F = (2(2f_2 + f_1) + f_0) \bmod 8$$

The vector $f_0$ is derived as described above, using the first FHT circuit 62. Then the output code word F is considered to be the symbol-wise sum modulo 8 of $f_0$ and twice the output code word of a decoder for the quaternary case, in place of the FHT circuits 64 and 66. Likewise, for the case j=4, the output code word is considered to be the symbol-wise sum modulo 16 of $f_0$ and twice the output code word of a decoder for the octary case, which in turn is treated either recursively as just described, or directly as described earlier. Other modifications of a similar nature can be envisaged.

The decoder as described above is a 'hard decision' decoder, i.e. it takes integer values between 0 and $2^j-1$ inclusive as input. The same decoder can also be used for 'soft decision' decoding, wherein the symbols of the received code word are represented as real numbers between 0 and $2^j$, according to the value of the received analogue signal. In deriving vectors $D_k$ by evaluating expression (4) for real-valued elements $(r_k)_z$, the term $(r_k)_z \bmod 2^{k+1}$ is taken to be the real number a having a value such that $0 \leq a < 2^{k+1}$ and such that $(r_k)_z - \alpha$ is an integer multiple of $2^{k+1}$. Each FHT circuit produces real-valued transform components, of which one with largest absolute value is selected. The rest of the decoding procedure is the same as described above.

For decoding code words comprising a base code word combined with a coset representative, as described above, the decoder 70 shown in FIG. 9 may be used. This decoder is intended for use with 16-symbol octary code words which comprise a code word selected from the octary base code and added symbol-wise modulo 8 to a selected one of the first eight coset representatives in Table 1 above. Encoders for implementing these steps are described in the above-referenced patent application.

As noted above, that patent application also describes decoders which use a modified version of the Supercode decoding method, in which each possible coset representative is subtracted symbol-wise (modulo $2^j$) from the received code word, and the result is decoded as an element of the base code, at the same time assigning a "score" (the largest absolute value of the FHT components) to that coset representative. With the decoding method illustrated in FIG. 8 and coset representatives which consist solely of symbol values of 0 and 4, there is no need to repeat the steps performed in the first and second FHT circuits 62 and 64 for each possible coset representative. These circuits derive the vectors $D_0$ and $D_1$ by modulo 2 and modulo 4 arithmetic respectively, and any coset representative comprising only symbol values of 0 and 4 reduces to a value of all 0 symbols under these arithmetics. Thus the subtraction of each coset representative need only be effected in respect of the third FHT circuit 66; the inputs to the first and second FHT circuits 62 and 64 need not involve the coset representatives.

Furthermore, it is not always necessary to repeat the processing in the third FHT circuit 66 for every relevant coset representative, with a view to comparing the scores and selecting a coset representative which attains the highest score. It is possible to determine both a maximum attainable score (maximum absolute transform component value), and a threshold which if exceeded for a particular coset representative causes the decoder 70 to omit processing of further coset representatives.

In the case of coset representatives derived from the generator array as described above, such as the coset representatives in Table 1, this threshold is equal to ¾ of the maximum absolute transform component value for the relevant FHT circuit. The maximum value and associated threshold for each circuit are independent of the value of j and are as follows:

| Circuit | Max | Threshold |
| --- | --- | --- |
| FHT circuit 64 | 16 | 12 |
| FHT circuit 66 | 32 | 24 |
| FHT circuit with index k | $2^{m+k-1}$ | $3 \cdot 2^{m+k-3}$ |

Figure 9:
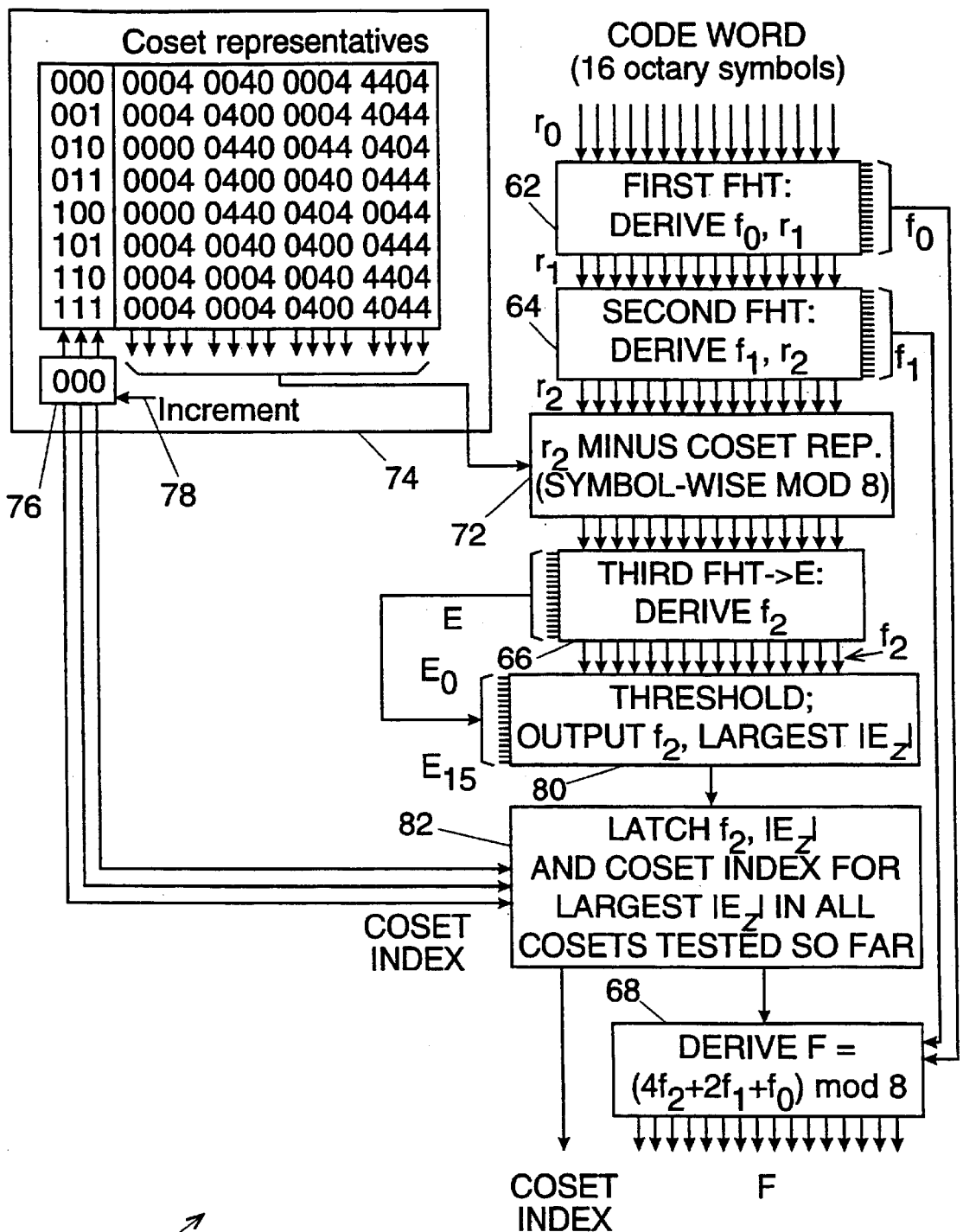
FIG. 9 shows a decoder based on the decoder of FIG. 8, for decoding 16-symbol octary code words and identifying an associated coset representative.

The decoder 70 shown in FIG. 9 takes advantage of these properties to restrict the amount of processing required.

Referring to FIG. 9 the 16-symbol octary code word received by the decoder 70 constitutes the input word $r_0$ for the first FHT circuit 62. As described above, this circuit applies the FHT and derives the vector $f_0$ and a modified word $r_1$. This modified word $r_1$ is supplied to the second FHT circuit 64, which derives the vector $f_1$ and the modified word $r_2$.

The modified word $r_2$ is supplied to a modulo-8 subtractor 72, which subtracts from that word, symbol-wise modulo eight, a value in a coset store 74. This coset store contains the values of the eight coset representatives from which selection is made during encoding of the code word. The store 74 also has a three-bit counter 76 which cycles through all eight possible three-bit values successively in response to an increment signal at an input 78, so that each of the eight coset representatives in turn is provided to the subtractor 72.

The word output by the subtractor 72 is supplied to the third FHT circuit 66, which derives the third vector $f_2$. The output of the Green machine in this third FHT circuit 66 is a vector E, comprising sixteen transform components $E_0$ to $E_{15}$.

The vectors $f_2$ and E are supplied to a comparator 80 which compares the absolute values of the transform components in the vector E, and identifies the largest absolute value $|E_z|$; if more than one component has the same largest absolute value, one of them is chosen arbitrarily. The comparator 80 then compares. the absolute value of the chosen component with the appropriate threshold value described above, in this case a value of 24; if the threshold is exceeded, no further coset representatives need to be tested. In either case, the comparator 80 outputs the vector $f_2$ and the value $|E_z|$ to a latch 82, which also receives the corresponding three-bit index value supplied by the counter 76 in the store 74.

For the first coset representative the latch 82 simply stores the vector $f_2$, the value $|E_z|$ and the coset index which it receives. If the threshold has not been exceeded the counter 76 is incremented, and another vector $f_2$ and value $|E_z|$ are derived and provided to the latch 82 for the next coset representative, together with the respective coset index. If such a transform component absolute value $|E_z|$ is larger than the absolute value currently latched, the latch 82 selects the newly received absolute value, together with its associated vector $f_2$ and the coset index. This cycle is repeated for each successive coset representative, until either the threshold is exceeded or the counter 76 has cycled through all eight possible values and every coset representative in the store 74 has been supplied to the subtractor 72.

Thereafter the two vectors $f_0$ and $f_1$ derived by the FHT circuits 62 and 64, and the vector $f_2$ latched by the latch 82, are supplied to the combiner circuit 68 to derive the output 16-symbol code word F from the base code according to the relationship $$F=(4f_2+2f_1+f_0)\bmod 8$$

The latched coset index identifies the coset representative which was combined with this base code word F in the original transmitted code word, provided the code word as received has not sustained excessive corruption.

The operation of the decoder 70 will be illustrated by reference to the same example 16-symbol octary code word used above (6417 5306 3164 2053), which is assumed to be combined with the third coset representative in the store 74 (0000 0440 0044 0404) to produce a transmitted code word 6417 5746 3120 2457. This transmitted code word is assumed to have been corrupted in transit and has been received as 6437 5046 4320 3457 (=$r_0$).

In the first FHT circuit 62 the 16-component vector $D_0$ is derived as described above, with the following components (after multiplication by two)

$$(1, 1, -1, -1, -1, 1, 1, 1, 1, -1, 1, 1, -1, 1, -1, -1)$$

The first FHT circuit 62 applies the FHT to this vector $D_0$ to derive sixteen transform components labelled from 0 to 15, as follows:

$$(2, -2, 2, -2, 2, 6, 2, 6, 2, -2, 2, -2, -6, -2, 10, -2)$$

The component of largest absolute value (10) is identified, the label (14) for this component is expressed as a four-bit binary value $c_1c_2c_3c_4$ (1110), and the coefficient c' is set to a value of 0. Then the vector $f_0$ is derived according to the relationship $$f_0=(c_1X_1+c_2X_2+c_3X_3+c_4X_4+c'X')\bmod 8$$

which in this example is $(X_1+X_2+X_3)\bmod 8$=0011 1122 1122 2233. The modified word $r_1$ supplied to the second FHT circuit 82 is derived according to the relationship $$r_1=(r_0-f_0)\bmod 8$$

and has a value of 6426 4724 3206 1224.

In the second FHT circuit 64 the 16-component vector $D_1$ is derived with components $$(-1, 1, -1, -1, 1, 0, -1, 1, 0, -1, 1, -1, 0, -1, -1, 1)$$

The second FHT circuit 64 applies the FHT to the vector $D_1$ to derive sixteen transform components labelled from 0 to 15, as follows:

$$(-3, -1, 1, 3, -3, 3, 1, -9, 1, -5, 5, -1, -3, -5, 1, -1)$$

A component of largest absolute value (−9) is identified, the label (7) for this component is expressed as a four-bit binary value $c_1c_2c_3c_4$ (0111), and the coefficient c' is set to a value of 1. The vector $f_1$ is derived according to the relationship $$f_1=(c_1X_1+c_2X_2+c_3X_3+c_4X_4+c'X')\bmod 4$$

i.e. $(X_2+X_3+X_4+X')\bmod 4$=1223 2330 1223 2330. The modified word $r_2$ is derived according to the relationship $$r_2=(r_1-2f_1)\bmod 8$$

and has a value of 4060 0144 1640 5444.

The subtractor 72 subtracts the first coset representative 0004 0040 0004 4404 in the store 74 from the modified word $r_2$, to derive a word 4064 0104 1644 1040, which is supplied to the third FHT circuit 66.

This third FMT circuit derives the vector $D_2$ with components $$(-2, 2, 0, -2, 2, 1, 2, -2, 1, 0, -2, -2, 1, 2, -2, 2)$$

and then applies the FHT to the vector $D_2$ to derive the sixteen transform components $E_0$ to $E_{15}$, as follows:

$$(1, -1, 13, -5, -11, -1, 1, -5, 1, 7, -3, -13, 1, -13, -3, -1)$$

A component of largest absolute value $|E_z|$ (13) is identified, the label z (2) for this component is expressed as a four-bit binary value $c_1c_2c_3c_4$ (0010), and the coefficient c' is set to a value of 0. The vector $f_2$ is derived according to the relationship $$f_2=(c_1X_1+c_2X_2+c_3X_3+c_4X_4+c'X')\bmod 2$$

i.e. $(X_3)\bmod 2$=0011 0011 0011 0011. The latch 82 stores this vector $f_2$, the value 13 and the coset index 000.

As the value $|E_z|$ has not exceeded the threshold value of 24, the next coset representative 0004 0400 0004 4044 is supplied by the store 74 to the subtractor 72, which derives a word 4064 0544 1644 1400 and supplies it to the third FHT circuit 66. This circuit derives the vector $D_2$ with components (−2, 2, 0,−2, 2,−1,−2,−2, 1, 0,−2,−2, 1,−2, 2, 2)

and applies the FHT to this vector to derive the sixteen transform components $E_0$ to $E_{15}$, as follows:

(−5, 5, 7, 1,−5,−7, 7,−11,−5,−3, 7,−7, 7,−3,−13,−7)

A component of largest absolute value $|E_z|$ (−13) is identified, the label z (14) for this component is expressed as a four-bit binary value $c_1c_2c_3c_4$ (1110), and the coefficient c' is set to a value of 1. The vector $f_2$ is derived according to the relationship $$f_2 = (c_1X_1 + c_2X_2 + c_3X_3 + c_4X_4 + c'X') \bmod 2$$

i.e. $(X_1 + X_2 + X_3 + X') \bmod 2 = 1100\ 0011\ 0011\ 1100$. As the value $|E_z|$ (13) is not larger than the currently latched value (13), the contents of the latch 82 are not changed.

Again the value $|E_z|$ has not exceeded the threshold value of 24, so the next coset representative 0000 0440 0044 0404 is supplied by the store 74 to the subtractor 72, which derives a word 4060 0504 1604 5040 and supplies it to the third FHT circuit 66. This circuit derives the vector $D_2$ with components (−2, 2, 0, 2, 2,−1, 2,−2, 1, 0, 2,−2,−1, 2,−2, 2)

and applies the FHT to this vector to derive the sixteen transform components $E_0$ to $E_{15}$, as follows:

(5,−1, 1,−5, 1,−1,−3,−5, 1, 3,−3,−1, 1,−25,−3, 3)

A component of largest absolute value $|E_z|$ (−25) is identified, the label z (13) for this component is expressed as a four-bit binary value $c_1c_2c_3c_4$ (1101), and the coefficient c' is set to a value of 1. The vector $f_2$ is derived according to the relationship $$f_2 = (c_1X_1 + c_2X_2 + c_3X_3 + c_4X_4 + c'X') \bmod 2$$

i.e. $(X_1 + X_2 + X_4 + X') \bmod 2 = 1010\ 0101\ 0101\ 1010$. Because the value of $|E_z|$ (25) is larger than the currently latched value (13), the latch 82 stores this vector $f_2$, the value and the coset index 010.

This time the threshold value of 24 has been exceeded, so it is not necessary to derive values of $f_2$ for any further coset representatives. The three vectors $f_0$, $f_1$ and $f_2$ are supplied to the combiner circuit 68 as described above to derive the code word F=(4(1010 0101 0101 1010)+2(1223 2330 1223 2330)+(0011 1122 1122 2233))mod 8=6417 5306 3164 2053, i.e. the base code word incorporated in the original, uncorrupted code word as transmitted. This code word F and the coset index 010 comprise the output of the decoder 70.

In the general case of code words of length $2^m$ symbols, each symbol having $2^j$ possible values, the subtractor 72 subtracts each coset representative from the word $r_{j-1}$ modulo $2^j$.

As described in the above-referenced patent application, the coset representatives may be chosen to include symbols with values other than 0 and $2^{j-1}$; for example, for octary code words coset representatives which may include symbol values of 2 and 6 as well as 0 and 4 may be chosen, to obtain a larger family of code words (at the expense of increased PMEPR). In such a case additional subtraction is needed before the second FHT circuit 64, with an additional comparator and latch after it analogous to the comparator 80 and latch 82. The complete set of chosen coset representatives is first reduced modulo 4, and all the distinct resulting residues are identified. It is these distinct residues which are subtracted, symbol-wise modulo 4, in turn in the additional subtraction operation to produce the input in respect of the second FHT circuit 64. The additional comparator and latch after this HFT circuit operate to select one of these residues, either because a score assigned to it attains the highest value, or because it exceeds a predetermined threshold, derived as described above. Processing in subsequent FHT circuits in the decoder continues in respect only of the coset representatives whose symbol-wise reduction modulo 4 equals the selected residue.

The decoders described above may be implemented in special-purpose hardware; in this case, whenever two or more distinct residues of the coset representatives are to be processed (for example, in the third FHT circuit 66 in the decoder 70 of FIG. 9), some or all of the associated fast Hadamard transforms can be calculated in parallel, for example by providing a Green machine for each one.

Modified versions of the decoders 60 and 70 described above can correct certain error patterns which cannot always be corrected by the decoders 60 and 70 themselves (and vice versa). In these modified versions the (k+1)th FHT circuit calculates the vector $D_k$ in the following manner. A vector $v_k$ is derived from the word $r_k$ by applying the expression $$((r_k)_z \bmod 2^{k+1})/2^k$$

for values of z from 0 to $2^m-1$ to define each respective component of the vector $v_k$. The vector $D_k$ is then derived from the vector $v_k$ by applying the expression $1-2(v_k)_z$ for values of z from 0 to $2^m-1$.

Next each FHT circuit applies the FHT to the vector $D_k$ to derive $2^m$ transform components, labelled from 0 to $2^m-1$. A component of largest absolute value is identified, the label for this component is expressed as an m-bit binary value $c_1c_2 \ldots c_m$, and a coefficient c' is set to a value of 0 or 1 according to whether the component is positive or negative respectively. Then the vector $f_k$ is derived according to the relationship $$f_k = (c_1X_1 + c_2X_2 + \ldots + c_mX_m + c'X') \bmod 2$$

For all but the final FHT circuit (k=j−1) the modified word $r_{k+1}$ supplied to the next FHT circuit is derived according to the relationship $$r_{k+1} = (r_k - 2^k(f_k + e_k)) \bmod 2^j$$

where the vector $e_k$ is derived as $$(v_k + f_k) \bmod 2$$

The j vectors $f_0, f_1, \ldots f_{j-1}$ are combined in the combiner circuit 68 according to the relationship $$F = (2^{j-1}f_{j-1} + 2^{j-2}f_{j-2} + \ldots + f_0) \bmod 2^j$$

to produce the required output base code word F.

When using such a modified decoder in conjunction with coset representatives including symbol values other than 0 and $2^{j-1}$ (for example, symbol values of 2 and 6 as well as 0 and 4 for octary code words) the distinct residues modulo $2^{k+1}$ of the remaining coset representatives are each subtracted from the vector $r_k$ prior to derivation of the vector $D_k$ in the (k+1)th FHT circuit.

The discussions above of octary codes have been expressed in terms of octary symbols having possible values of 0 to 7. For actual transmission, for example by 8-phase-shift keying (8-PSK)modulation, these values would correspond to eight different values of phase shift. One possibility is phase shifts of 0°, 45°, 90°, 135°, 180°, 225°, 270° and 315° (equivalent to complex vectors 1, $(1+i)/\sqrt{2}$, i, $(-1+i)/\sqrt{2}$, $-1$, $(-1-i)/\sqrt{2}$, $-i$ and $(1-i)/\sqrt{2}$ respectively, where $i=\sqrt{-1}$). However, other variants are possible in which the phase shifts are, for example, 22½°, 67½°, 112½°, 157½°, 202½°, 247½°, 292½° and 337½° (equivalent to complex vectors $[\sqrt{(2+\sqrt{2})}+i\sqrt{(2-\sqrt{2})}]/2$, $[\sqrt{(2-\sqrt{2})}+i\sqrt{(2+\sqrt{2})}]/2$, $[-\sqrt{(2-\sqrt{2})}+i\sqrt{(2+\sqrt{2})}]/2$, $[-\sqrt{(2+\sqrt{2})}+i\sqrt{(2-\sqrt{2})}]/2$, $[-\sqrt{(2+\sqrt{2})}-i\sqrt{(2-\sqrt{2})}]/2$, $[-\sqrt{(2-\sqrt{2})}-i\sqrt{(2+\sqrt{2})}]/2$, $[\sqrt{(2-\sqrt{2})}-i\sqrt{(2+\sqrt{2})}]/2$ and $[\sqrt{(2+\sqrt{2})}-i\sqrt{(2-\sqrt{2})}]/2$, respectively). This principle applies for codes with more symbol values ($j>3$), and indeed in other applications the symbol values may be represented by any $2^j$ distinguishable signal modulations; their amplitudes need not be equal, and, in the case of phase-shift keying, the phase differences between adjacent pairs need not all be equal.

The description above has referred to linear $2^j$-ary codes in which code word symbols each have $2^j$ possible values, such as quaternary ($2^2$) and octary ($2^3$), and the decoding operations are performed with respect to a 2-ary (binary) code. However, the invention is also applicable to $p^j$-ary codes in which the code word symbols each have $p^j$ possible values, where p is a prime other than 2, for example a $3^2$-ary (nonary) system, and the decoding operations are performed with respect to a p-ary code.

What is claimed is:

1. A method of identifying a code word within a predetermined set of code words, the code words including symbols each having $p^j$ different possible values where p is a prime and j is an integer greater than 1, said method comprising:

deriving a plurality of constituents, $constituent_1$ to $constituent_k$ of said code word with respect to an input word, each constituent identifying an element of a predetermined subset of a predetermined linear code; and combining said k constituents to identify said code word according to a relationship $(p^{b(k)}*constituent_k + p^{b(k-1)}*constituent_{k-1} + \ldots + p^{b(2)}*constituent_2 + p^{b(1)}*constituent_1) \bmod p^j$ where each b(x) is an integer, x is an integer from 1 to k, $j>b(k)>b(k-1)> \ldots >b(2)>b(1)\geq 0$, * indicates symbol-wise multiplication, + indicates symbol-wise addition and mod indicates symbol-wise modular reduction.

2. The method of claim 1, wherein k=j.

3. The method of claim 2, wherein the derivation of $constituent_x$ involves symbol-wise modulo $p^x$ reduction.

4. The method of claim 1, wherein p=2.

5. The method of claim 1, wherein at least two of said constituents identify elements of two different respective predetermined subsets.

6. The method of claim 1, wherein said constituents are derived by applying k respective decoding steps.

7. The method of claim 6, wherein each decoding step yields a set of row coefficients of a generator matrix of a linear p-ary code and the constituent derived by each respective decoding step is derived from the respective set of row coefficients.

8. The method of claim 6, wherein $constituent_1$ is derived by applying a decoding step in respect of said input word, $constituent_2$ is derived by applying a decoding step in respect of said input word modified as a function of $constituent_1$, and each remaining constituent is derived by applying a respective decoding step in respect of a modified input word used for derivation of the preceding constituent, further modified as a function of that preceding constituent.

9. The method of claim 6, wherein each decoding step comprises a single decoding operation.

10. The method of claim 6, wherein at least one predetermined decoding step comprises a plurality of decoding operations.

11. The method of claim 10, wherein said plurality of decoding operations comprising a decoding step are terminated if a parameter evaluated during the decoding operations exceeds a predetermined threshold.

12. The method of claim 11, wherein said threshold is three-quarters of a maximum value attainable by said parameter.

13. The method of claim 9, wherein each said decoding operation involves a Hadamard transform or equivalent thereof.

14. The method of claim 1, wherein each symbol of said input word has an integer value.

15. A method of identifying a code word within a predetermined set of code words, the code words including symbols each having $2^j$ different possible values where j is an integer greater than 1, comprising the steps of receiving an input word;

deriving the result of the input word reduction modulo $2^1$;

deriving a first constituent, $constituent_1$, by applying a Hadamard transform operation, or equivalent thereof, in respect of the result of said reduction modulo $2^1$;

setting a modifier equal to $constituent_1$;

for each successive value of a counter x from 2 to j:

deriving the result of symbol-wise subtraction of the current value of the modifier from the input word reduction modulo $2^x$;

deriving another constituent, $constituent_x$, by applying a Hadamard transform operation, or equivalent thereof, to the result of said symbol-wise subtraction of the current value of the modifier from the input word modulo $2^x$;

setting the modifier equal to the symbol-wise sum modulo $2^j$ of the preceding modifier and the product of $2^{x-1}$ times $constituent_x$; and identifying the code word as having the final value of said modifier.

16. Apparatus for identifying a code word within a predetermined set of code words, the code words including symbols each having $p^j$ different possible values where p is a prime and j is an integer greater than 1, comprising:

a decoder for deriving in respect of an input word a plurality of constituents, $constituent_1$ to $constituent_k$, of said code word, each constituent identifying an element of a predetermined subset of a predetermined linear code; and a combiner for combining said k constituents to identify said code word according to a relationship $(p^{b(k)}*constituent_k + p^{b(k-1)}*constituent_{k-1} + \ldots + p^{b(2)}*constituent_2 + p^{b(1)}*constituent_1) \bmod p^j$ where each b(x) is an integer, x is an integer from 1 to k, $j>b(k)>b(k-1)> \ldots >b(2)>b(1)\geq 0$, * indicates symbol-wise multiplication, + indicates symbol-wise addition and mod indicates symbol-wise modular reduction.

* * * * *